(12) United States Patent
Moreland

(10) Patent No.: US 6,343,938 B1
(45) Date of Patent: Feb. 5, 2002

(54) MOON PHASE DEMONSTRATION SYSTEM

(76) Inventor: David R. Moreland, 705 Aransas Dr., Euless, TX (US) 76039

( * ) Notice: Subject to any disclaimer, the term of this patent is extended or adjusted under 35 U.S.C. 154(b) by 0 days.

(21) Appl. No.: 09/651,084

(22) Filed: Aug. 30, 2000

(51) Int. Cl.$^7$ .............................................. G09B 23/09
(52) U.S. Cl. .......................... 434/284; 434/292; 40/540
(58) Field of Search ................................. 434/284, 290, 434/291, 292, 293, 288; 40/427, 442, 540

(56) References Cited

U.S. PATENT DOCUMENTS

| | | |
|---|---|---|
| 320,999 A | 6/1885 | Berneike |
| 583,540 A | 6/1897 | McDonald |
| 1,195,420 A | 8/1916 | Tsuru |
| 1,484,174 A | 2/1924 | Divo |
| 2,287,594 A | 6/1942 | Barbagelata |
| 2,550,805 A * | 5/1951 | Greenfield .................. 434/284 |
| 3,520,073 A * | 7/1970 | Baader ....................... 434/284 |
| 4,400,162 A * | 8/1983 | Rustemis ..................... 434/291 |
| D303,296 S | 9/1989 | Arts |
| 4,887,250 A * | 12/1989 | Vuarnesson .................. 368/15 |
| 5,344,325 A * | 9/1994 | Wang .......................... 434/288 |
| 5,529,500 A * | 6/1996 | Dahlman ..................... 434/292 |

* cited by examiner

Primary Examiner—Kien T. Nguyen
(74) Attorney, Agent, or Firm—Jones, Tullar & Cooper, P.C.

(57) ABSTRACT

An educational astronautical system for instructing students in the cause and result of the phases of the moon. A hollow outer sphere has a smaller inner sphere mounted in the center of the inside space of the outer sphere. The inner sphere resembles the surface of the moon. A light source ifs provided on the equator of the outer sphere to illuminate the surface of the inner sphere. A eight viewing stations are provided, equally spaced around the equator of the outer sphere, one of said viewing stations being placed coincident with the light source whereby viewing the inner sphere from different stations gives the viewer a picture of a different phase of the moon at each station.

6 Claims, 2 Drawing Sheets

MOON PHASE DEMONSTRATION SYSTEM

BACKGROUND OF THE INVENTION

This invention relates in general to astronautical educational devices and, in particular, to a system for demonstrating and explaining the phases of the moon to students.

Most students have a rudimentary knowledge of the various phases of the moon but do not understand what causes these phases. They are familiar with the terms "full moon", and "new moon" but are unaware of the causes of the changes which causes the change in the moon's appearance. A solely verbal explanation of the process of the moons various phases requires that the student have an understanding of the spacial and dynamic relationship of the earth and its sister planets with the sun and, more particularly, the relationship of the moon to these other celestial bodies. Such spatial relationships are difficult for many students to conceive and under stand, especially younger students.

Large planetary demonstration systems which can illustrate the sun-earth-moon interactions are available. However, they are expensive to build and operate and therefore are not readily available to all students. What is needed is a small portable inexpensive demonstrator which can be readily available and affordable in all classrooms.

SUMMARY OF THE INVENTION

The present invention described herein overcomes these disadvantages bay providing an uncomplicated, inexpensive astronautical demonstrator for classroom use which can readily and visually explain and demonstrate the sun-earth-moon interactions which cause the familiar phases of the moon to appear to viewers on earth.

The system of this invention provides a large outer hollow sphere, the inside surface of which, represents the closed universe. Positioned in the center of this "universe" is a smaller inner sphere which represents the moon as viewed from earth. On the equator of the larger sphere, there is provided a light source extending through the outer surface of the outer sphere for illuminating the inner sphere "moon" on the side facing the light source which represents the sun in this system. Arranged around the equator of the outer sphere are a plurality of viewing stations which allow the user of the system to view the moon from different angles with respect to the position of the sun. Each viewing station provide the viewer with a view of a different phase of the moon because of the angular relationship of the viewing stations to the "sun" light source.

A detailed description of the invention and its operation are set forth in the specification below.

DETAILED DESCRIPTION OF THE PREFERRED EMBODIMENT

Figure 1:
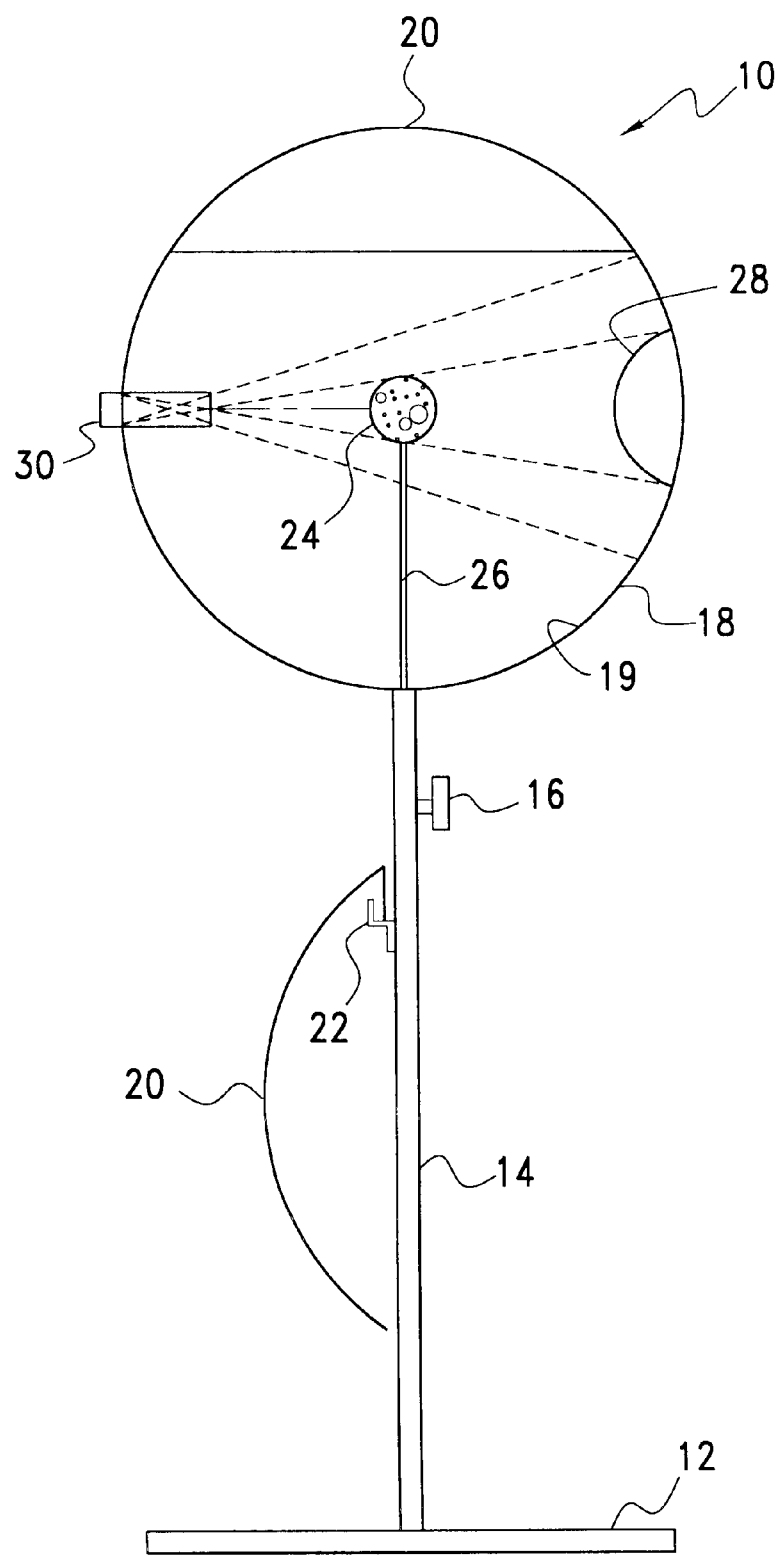
FIG. 1 is a sectional elevation view of the invention.

Referring now to FIG. 1, there is shown a sectional elevation view of the invention indicated generally at 10. The system is supported on a base 12 of sufficient weight to provide a stable mounting. A supporting shaft 14 is provided to support the outer sphere 18. The shaft 14 is adjustable in height to accommodate users of different sizes. A knob 16 is loosened to extend or shorten the shaft in the well known manner. The outer sphere 18 would typically have an outer diameter of about 24 inches. The outer surface of the outer sphere can be decorated in any suitable manner. For example, it could be colored to represent the outer surface of the moon. The inner surface 19 of the outer sphere is decorated to represent the closed universe as seen from earth. Inside the outer sphere the inner sphere 24 representing the moon is positioned at the approximate center of the outer sphere. It is supported on a rod 26 which is adjustable to insure the proper positioning of the moon 24. The surface of the inner sphere 24 is decorated to resemble the surface of the moon.

At one point on the equator of the outer sphere 18 there is provided a spherical light source 28. This may be a simple battery powered source or may be connected to a regular AC power source. A simple on-off (not shown) switch would be provided to control the light. The light source 28 is designed to illuminate the inner sphere 24 in the manner in which the sun illuminates our moon. In FIG. 1, there is shown a single viewing station 30, in this case it is diametrically opposite the light source 28. From this position, the view of the moon for the observer would be that of an eclipsing new moon. The top cover portion 20 of the outer sphere mat be separated from the main body of the sphere 18 to allow access to the inner areas of the system to allow adjustment of the components and make cleaning the inside of the sphere easier. The cover 20 can be conveniently stored on a clip 22 provided on the stand 14

Figure 2:
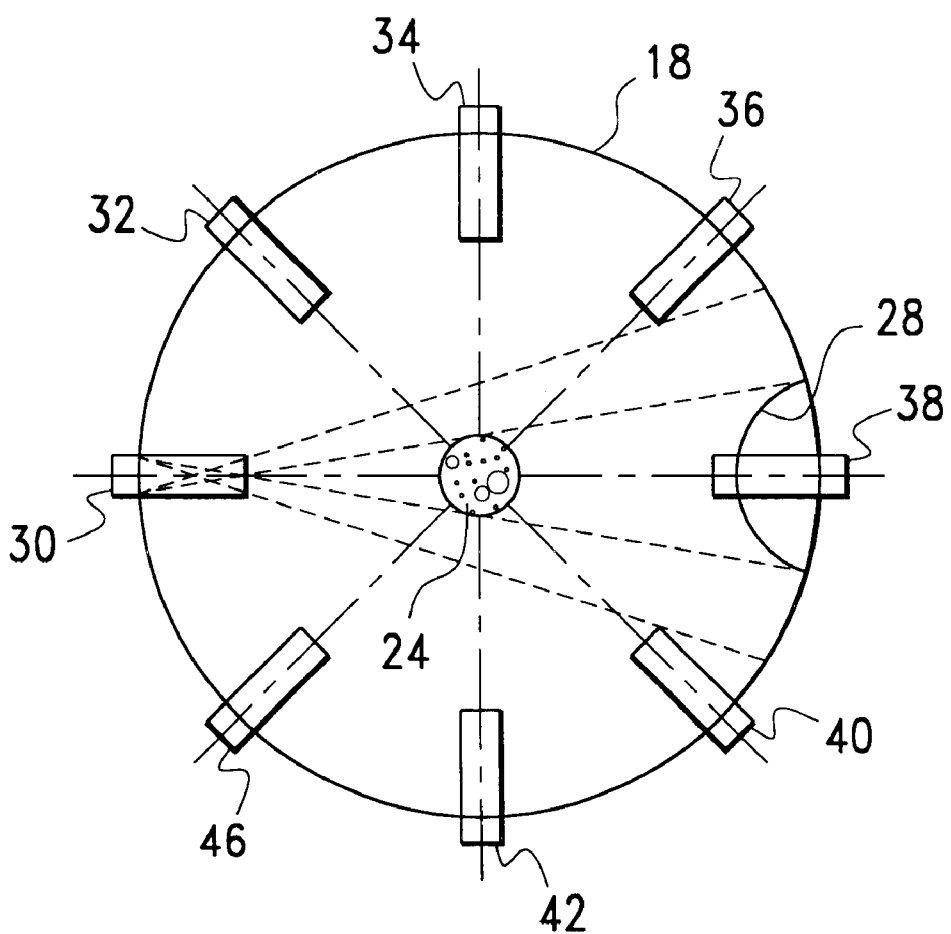
FIG. 2 is a sectional plan view of the invention.

Referring now to FIG. 2, there is shown a sectional plan view of the invention. The "moon" inner sphere 24 is shown at the center of the outer sphere 18 and is illuminated by the light source 28. As viewed from viewing station 30, the moon would appear as an eclipsing new moon as discussed above. Moving clockwise to the other viewing stations, the view from viewing station 32 would be that of a first quarter new moon; from station 34, a half moon. The view from station 36 is a ¾ moon and a full moon is seen when viewed from station 38. In a similar manner, the waning quarters of the moon would be seen from stations 40, 42 & 46 respectively. In this configuration, the viewing stations are angularly spaced at approximate 45 degrees giving a total of eight stations in all. The number of stations can be varied according to the preference of the instructor. More stations would provide smaller lighting increments from station to station and fewer stations would give a coarser grain the observable lighted portions of the moon.

Thus it can be seen that there is provided by this invention, a simple, effective and affordable system for demonstrating the earth-sun-moon interrelationship which causes the phases of the moon seen from the earth. This is a simple system which can be easily operated by students of all ages which provides an understanding of an otherwise difficult space-time visualization.

What is claimed is:

1. An astronautical educational system for displaying the phases of the moon, said system comprising:
    a base and standard for supporting said system;
    an outer hollow sphere mounted on said standard;
    an inner sphere mounted in the center of said outer sphere;
    a light source mounted on the equator of said outer sphere for illuminating one side of said inner sphere; and
    a plurality of viewing stations spaced around the equator of said outer sphere for viewing the lighted inner sphere, each of said viewing stations providing a view illustrating a different phase of the moon.

2. The astronautical educational system according to claim 1, wherein said inner sphere is decorated to appear as the moon.

3. The astronautical educational system according to claim 2 wherein the inner surface of said outer sphere is decorated to appear as the sky of the universe.

4. The astronautical educational system according to claim 3 wherein the number of viewing stations is eight stations equally spaced around the equator of the outer sphere.

5. The astronautical educational system according to claim 4 wherein the location of one of said viewing stations is coincident with the position of said light source and the remaining seven stations are spaced approximately 45 degrees apart around the equator of the outer sphere.

6. The astronautical educational system according to claim 5 wherein the outer surface of the outer sphere is decorated to resemble the surface of the moon.

* * * * *